[54] BOVINE TEAT DILATOR AND MEDICAMENT DISPENSER

[76] Inventor: Dale A. Gordhamer, P.O. Box 334, 1516 Harding St., Eau Claire, Wis. 54701

[22] Filed: Aug. 14, 1973

[21] Appl. No.: 388,089

[52] U.S. Cl.............. 128/343, 128/343, 128/348, 128/350
[51] Int. Cl.................... A61m 29/00, A61m 31/00
[58] Field of Search........ 128/343, 348, 350 R, 241, 128/349

[56] References Cited
UNITED STATES PATENTS

| | | | |
|---|---|---|---|
| 876,775 | 1/1908 | Crittenden | 128/343 |
| 2,450,217 | 9/1948 | Alcorn | 128/350 R |
| 2,704,076 | 3/1955 | Larson | 128/348 |
| 3,030,960 | 4/1962 | Turner et al. | 128/348 |
| 3,385,300 | 5/1968 | Holter | 128/343 X |

FOREIGN PATENTS OR APPLICATIONS

| | | | |
|---|---|---|---|
| 5,445 | 3/1891 | Great Britain | 128/343 |

Primary Examiner—Aldrich F. Medbery
Attorney, Agent, or Firm—John M. Diehl

[57] ABSTRACT

A dilator for an injured or diseased teat of a cow has a base portion and a portion to be inserted in the milk duct. The latter portion is provided with a spirally grooved conical outer wall and a central passage extends axially entirely through both portions and diverges in the base portion to provide a substantially conical cavity. Radially extending apertures in the wall communicate with the passage. A closure member may be attached to the base portion by interlocking means involving resilient deformation of the closure. The closure member has an internally protruding portion which occupies a large portion of the conical cavity whereby medicaments may be contained therein to force material contained in said cavity upwardly through said passage.

1 Claim, 9 Drawing Figures

PATENTED JUL 2 1974 3,821,956

ACTUAL SIZE 3,821,956

BOVINE TEAT DILATOR MEDICAMENT DISPENSER

FIELD

This invention relates to a teat dilator and more particularly to a device generally referred to as a teat tube, teat dilator or teat cannula to be inserted into the canal within the teat of a bovine animal referred to as the teat canal, streak canal or milk duct.

PRIOR ART

U.S. Pat. No. 3,071,139 issued Jan. 1, 1963, to B. R. Nicholson, No. 3,030,960 issued Apr. 24, 1962, to E. S. Turner et al., No. 2,704,076 issued Mar. 15, 1955, to H. J. Larson, No. 2,450,217 issued Sept. 28, 1948, to H. A. Alcorn, and No. 1,688,795 issued Oct. 23, 1928, to Nils Aas show devices having similar objectives.

U.S. Pat. No. 1,995,051 issued Mar. 19, 1935, to R. S. Dunson, No. 1,888,977 issued Nov. 29, 1932, to J. C. Bowen, No. 572,713 issued Dec. 8, 1896, to J. E. O'Sullivan and No. 206,820 issued Aug. 6, 1878, to B. F. Perkinson show somewhat similar devices which may be inserted in the milk duct for the ostensible purpose of milking a cow.

Of the above mentioned patents, U.S. Pat. Nos. 572,713; 206,820; 2,450,217 and possibly 1,688,795 show spiral grooves or threads in the exterior wall of the insertable portion. In addition U.S. Pat. No. 1,273,665, issued July 23, 1918, to E. D. Porter, No. 1,888,349 issued Nov. 22, 1932, to C. M. Jacoby and No. 3,385,300 issued May 28, 1968, to J. W. Holter show catheters or cannuli having exterior walls provided with a threaded or spiral configuration.

None of these shows a symmetrical conical wall provided with two spiral grooves and none show a conical exterior wall having two spiral grooves and further provided with radial drainage apertures and a terminal drainage aperture to a passage extending therethrough provided at the tip of the insertable portion.

Of the above patents, U.S. Pat. Nos. 3,030,960 and 2,704,076 show base portions to which a closure is threadedly attached and U.S. Pat. No. 3,071,139 shows a closure member which may be attached to the base portion by resilient defamation of the closure member to provide attachment by means of interlocking members but none of the above patents shows a closure member having a portion which extends into a cavity provided by an extension of the passage in the interior of the device.

SUMMARY

In an animal suffering from mastitis, the teat often becomes unusable due to internal degregation and to adhesions formed in the milk duct unless a device of the type described is first employed to prevent adhesions in the milk duct and to provide for insertion of medicaments. If no such device is applied, even if remission of the disease is accomplished no milk can be obtained from the quarter which becomes unusable due to degradation of the teat and milk product of the cow is so diminished that it is usually uneconomical to retain the cow in the herd. The economics of dairying are so intense that under these circumstances it is usually necessary to dispose of the cow and consequently as a result of no more than a defective teat an entire very valuable cow may be lost.

Teats often become mechanically injured and such injury is often an indication for application of a teat dilator for similar reasons.

It may be mentioned that remarks made herein as applying to cows may apply equally to goats.

It is desirable that a teat dilator be retained in the teat during the entire period that indications call for its application so that milk may be withdrawn through the device at each milking and it is desirable that the device itself not add to the injury of the teat and that the device provide means for introducing medication into the milk duct.

OBJECTS

It is therefore an object of the invention to provide an improved teat dilator which has better holding power in the teat, avoids injury and degradation of the teat and provides improved means to introduce chematherapeutic drugs into the milk duct.

Further objects will be apparent from the following detailed description.

DRAWINGS

In the drawings, like reference numerals refer to like parts and:

DESCRIPTION

Figure 1:
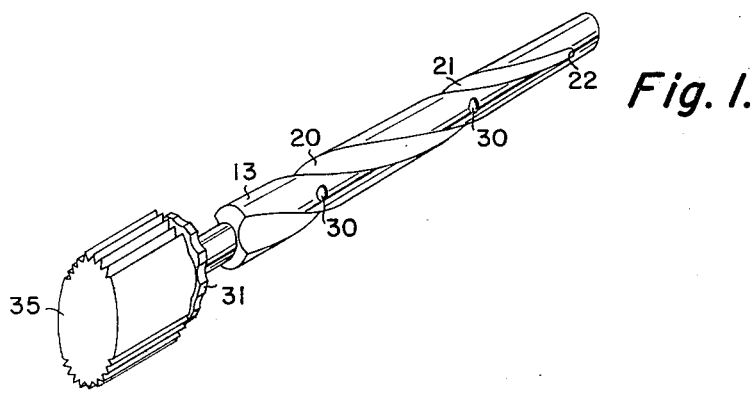
FIG. 1 is a perspective view of the assembled device.
Figure 2:
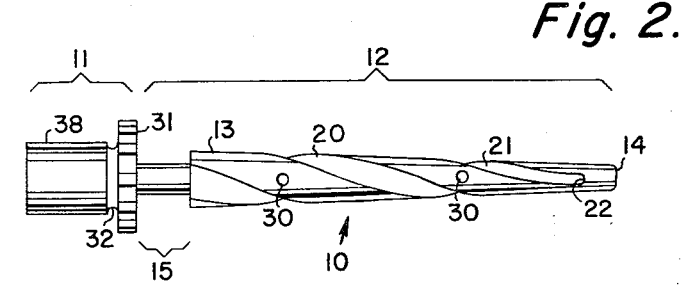
FIG. 2 is a side-elevation of the device without the enclosure.
Figure 3:
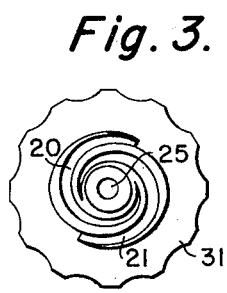
FIG. 3 is an end elevation from the upper end of the device.
Figure 5:
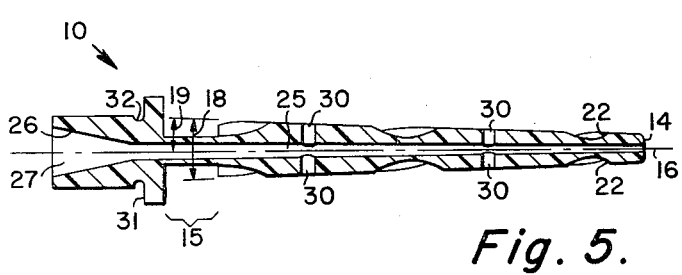
FIG. 5 is a medial cross-sectional view of the device of FIG. 2.
Figure 4:
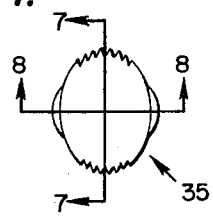
FIG. 4 is an end elevation from the lower end of the closure.
Figure 6:
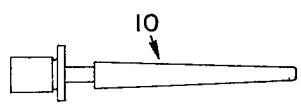
FIG. 6 is a view corresponding to FIG. 2 with the enclosure attached thereto showing the approximate actual size of one embodiment.

Referring now to FIGS. 1, 2, 3, 5 and 6 the teat dilator indicated generally as 10 comprises base portion 11 and insert portion 12 having conical wall 13 diverging downwardly and outwardly from tip 14 toward base portion 11 and thence being inwardly restricted at 15 adjacent base portion 11. The device is substantially symmetrical with respect to axis 16 and the angle of the exterior of conical wall 13 with respect to the axis 16 indicated by arrow 19 is preferably from 1°15' to 3°45' so that the included angle as indicated by arrow 18 is from 2°30' to 7°30'. Angle 18 in the embodiment shown is about 4°20'. Two spiral grooves 20 and 21 are provided in wall 13 extending from a point at 22 near the tip 14 of insert portion 12 to (but not into) portion 15. The pitch of these grooves is preferably such, as shown, that insert portion 12 may be inserted in the teat canal with no more than a full turn and no less than a half turn.

Extending entirely through the device substantially symmetrical with axis 16 there is provided passage 25 which, as shown, is substantially cylindrical within insert portion 12 and is provided with a diverging substantially conical wall 26 within portion 11 to provide cavity 27 therewithin.

Passage 25 is open, as shown, at tip 14 to communicate with the interior of the milk duct at tip 14 and a plurality of radially extending holes 30 (four in number in the preferred embodiment shown) are provided extending through wall 13 to provide further communication between the interior of the milk duct and passage 26. Holes 30 may be greater or lesser in number and need not extend radially but may extend at an angle if desired.

Figures 7, 8:
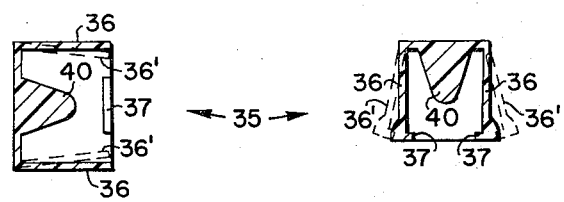
FIG. 7 is a cross-sectional view of the closure taken on lines 7—7 in FIG. 4.
FIG. 8 is a cross-sectional view of the closure taken on lines 8—8 in FIG. 4.
Figure 9:
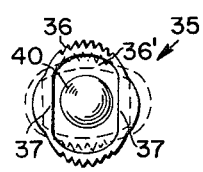
FIG. 9 is an end view of the closure.

Base portion 11 is provided with annular flange 31 to limit insertion of the device to insert portion 12, that is, to prevent insertion in the teat canal of base portion 11 and base portion 11 is provided with groove 32 to receive the closure indicated generally as 35 (FIGS. 7, 8 and 9).

Closure 35 is provided of a resilient material such as, for example, polyethylene. In a preferred embodiment, closure 35 may be distended into the position shown in dotted lines at 36' by suitably squeezing with the fingers in order to provide for inwardly extending portions 37 of walls 36 to clear outer wall 38 of base portion 11 as closure 35 is placed thereupon. Upon release of finger pressure, walls 36 return to the position shown in full lines and portions 37 are received in groove 32 to thereby retain closure 35 in place attached to base portion 11.

Thus closure 35 may easily be removed each time the animal is to be milked and may easily be replaced after each milking.

Closure 35 is provided with an interior upwardly extending protruding portion 40 which preferably has substantially conical walls as shown to match substantially the shape of the cavity 27 so that upon attachment of closure 35 to portion 11 said protruding portion 40 substantially occupies a large portion of cavity 27. By first placing a medicament, for example, in the form of an ointment, in cavity 27 and then attaching closure 35 in the manner heretofore described, member or portion 40 occupies the space in cavity 27 previously occupied by the medicament and forces the medicament through passage 26 into the streak canal at tip 14 and also through holes 30.

It will be apparent to those skilled in the art that equivalents may be utilized.

Accordingly, the present invention may be embodied in other specific forms without departing from the spirit or essential attributes thereof, and, accordingly, reference should be made to the appended claims, rather than to the foregoing specification, as indicating the scope of the invention.

It is claimed:

1. In a bovine teat dilator and medicament dispenser having an axis and comprising an insert portion having a tip and having spiral grooves in the exterior thereof and a base portion and means for closing and dispensing through said base portion including a resilient closure member, said insert portion having a passage extending entirely therethrough from said tip to the other end thereof, said passage in said insert portion having a substantially cylindrical wall and said passage in said base portion having a substantially conical wall diverging from said cylindrical wall and thereby providing a cavity, the outer wall of said insert portion being a conical wall diverging downwardly from said tip toward said base portion with an included angle of from 2°30' to 7°, and thence being inwardly restricted, said spiral grooves being two in number and extending nearly from said tip to but not into said inwardly restricted portion, said outer walls having holes therein extending from the exterior thereof into said passage, said base portion having a flange extending outwardly to limit insertion in a teat canal to said insert portion, said base portion sized to have said closure member attached thereto by non-threaded interlocking means for resilient deformation of said member, said closure member further including an upwardly extending conical protruding portion which substantially occupies a large portion of said cavity when seated therein to define a means for dispensing medicament.

* * * * *